Aug. 16, 1966  N. J. ANDERSON  3,267,359
PHASE SLOPE COMPENSATOR
Filed Aug. 14, 1962  2 Sheets-Sheet 1
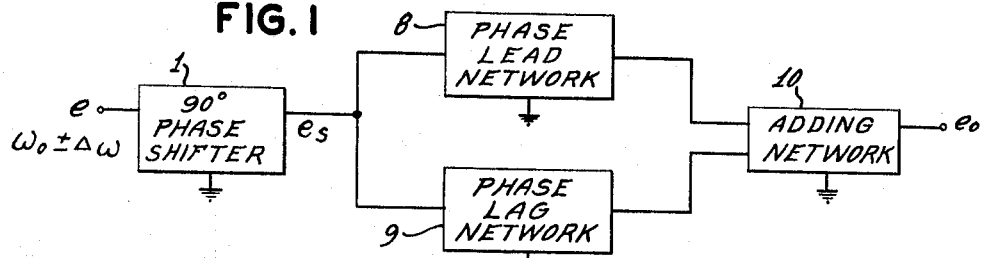
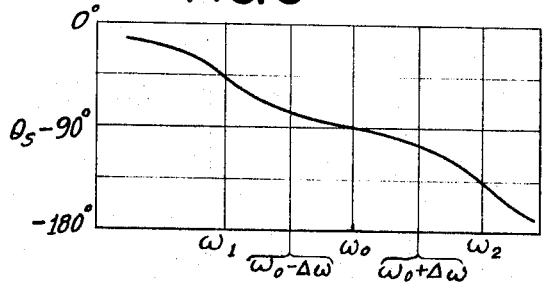
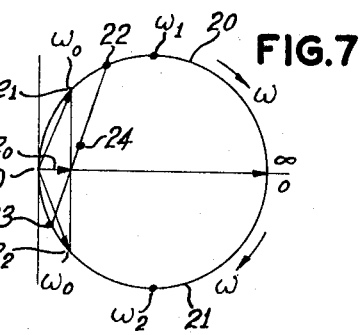
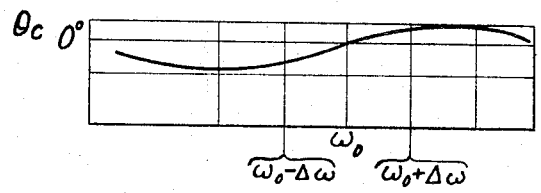
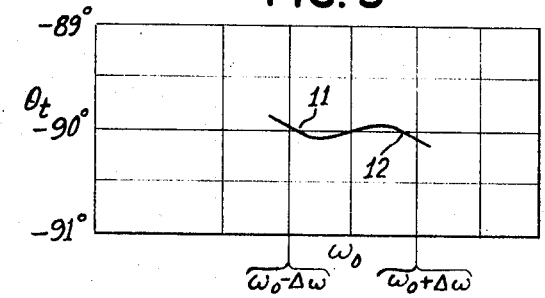
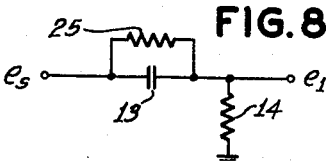
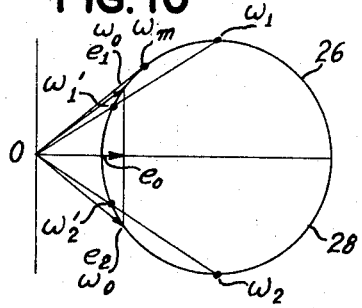
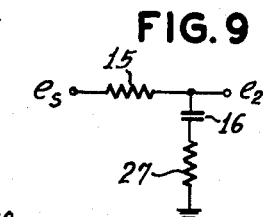
INVENTOR.
Norman J. Anderson
BY James A. Eisenman
ATTORNEY Aug. 16, 1966 N. J. ANDERSON 3,267,359
PHASE SLOPE COMPENSATOR
Filed Aug. 14, 1962 2 Sheets-Sheet 2

INVENTOR.
Norman J. Anderson
BY James A. Eiseman
ATTORNEY

United States Patent Office 3,267,359
Patented August 16, 1966

3,267,359
PHASE SLOPE COMPENSATOR
Norman J. Anderson, Boonton, N.J., assignor to North Atlantic Industries, Inc., Plainview, N.Y., a corporation of New York
Filed Aug. 14, 1962, Ser. No. 216,886
12 Claims. (Cl. 323—122)

This invention relates to phase slope compensators, and particularly to circuits for providing a phase shift that varies with frequency, over a band of operating frequencies, in a predetermined manner to correct or compensate for frequency-dependent phase errors such as residual phase variations in the output of a nominally fixed phase shift device.

The term "phase slope" as used herein means the rate of change of phase with change of frequency. Ideally, a phase shifter intended to provide a fixed phase shift of say 90 degrees throughout a frequency band should have zero phase slope at all frequencies in said band. Practical nominally fixed phase shifters do exhibit small, but finite phase slopes in the operating band, and generally the phase slope itself varies perceptibly as a function of frequency. In relatively simple phase shifters embodying resistance-capacitance networks, the phase slope is usually negative, that is, the phase changes in the direction of decreasing lead, or increasing lag, with increasing frequency.

The principal object of this invention is to provide phase slope compensators that can be designed to match the phase slope of a nominally fixed phase shifter to a high precision, for example one-tenth degree, over a broad frequency band, for example one and one-half octave.

Another object is to provide compensators of the foregoing type that are simple and economical to construct, requiring only a small number of resistors and capacitors as circuit elements.

A further object is to provide phase slope compensators that are substantially free of objectionable attenuation slope.

Another object is to provide phase slope compensators that can be designed to present a complex impedance to the phase shifter to be compensated, of substantially the same impedance angle as the output impedance of the phase shifter.

The foregoing objects are achieved in accordance with the invention by the combination of two networks, one designed to provide a positive, i.e. leading, phase shift in the frequency range of interest, and hereinafter referred to as a phase lead network, and the other designed to provide a lagging phase shift in said frequency range and hereinafter referred to as a phase lag network. The input terminals of the two networks are connected together to the source of signal whose phase slope is to be compensated.

The outputs of the networks are additively combined to produce a resultant output in which the phase slope of the compensator is superimposed upon that of the source. The networks are designed, as will be described, to provide a close approximation to the ideal compensating phase slope at all frequencies in the operating band.

The invention will be described with reference to the accompanying drawings, wherein;

FIG. 1 is a schematic block diagram illustrating generally a 90 degree phase shifter and the components of a phase slope compensator;

FIG. 2 is a circuit diagram of a representative 90 degree phase shifter with which the phase slope compensator of the invention is adapted to be used;

FIG. 3 is a graph of the phase shift vs. frequency characteristic of the phase shifter of FIG. 2;

FIG. 4 is a graph of the phase shift vs. frequency characteristic of a phase slope compensator suitable for compensating the characteristic shown in FIG. 3;

FIG. 5 is a graph of the result of the combination of the characteristics represented in FIGS. 3 and 4, over the frequency range of interest;

FIG. 6 is a circuit diagram of a simple phase slope compensator of the type shown in FIG. 1;

FIG. 7 is a polar diagram of the voltage transfer characteristic of the circuit of FIG. 6;

Figure 11:
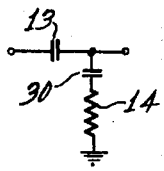
Figure 12:
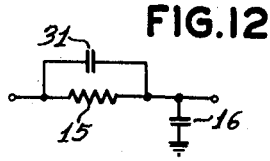
Figure 13:
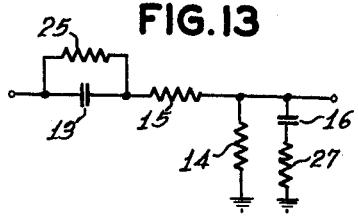
Figure 14:
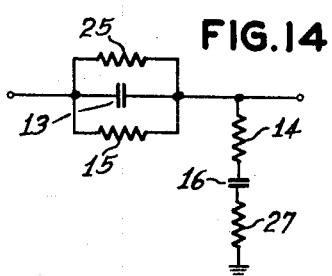
Figure 15:
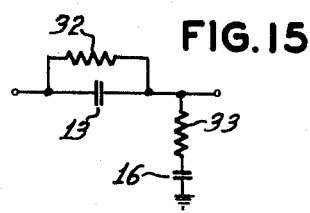
Figure 16:
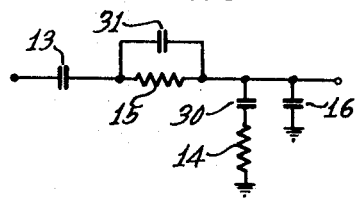
Figure 17:
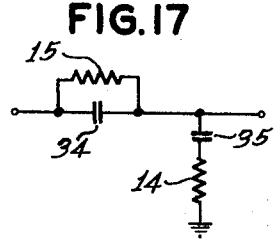
Figure 18:
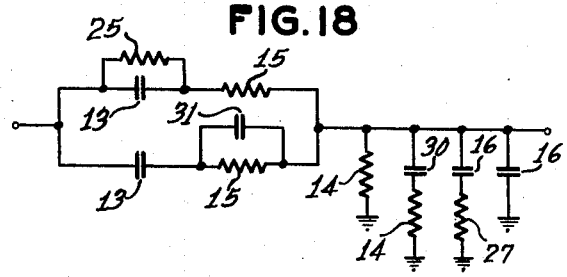
Figure 19:
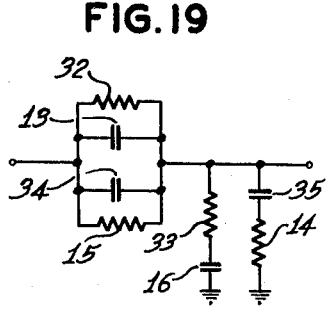
Figure 20:
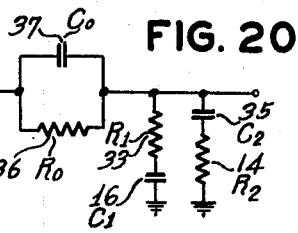

FIGS. 8 and 9 respectively are circuit diagrams of step networks that can be used as phase lead and phase lag networks in the slope compensator of FIG. 1;

FIG. 10 is a polar diagram of the voltage transfer characteristic of a slope compensator embodying the networks of FIGS. 8 and 9;

FIGS. 11 and 12 are circuit diagrams of "duals" of the circuits of FIGS. 8 and 9 respectively, in which the stop elements are capacitors instead of resistors;

FIG. 13 is a circuit diagram of a modified phase slope compensator in which the phase lead and phase lag networks are merged to provide additive combination of their outputs at a common output terminal without requiring separate adding network elements;

FIG. 14 is a circuit diagram of another modification wherein the lead and lag networks are merged in a second manner;

FIG. 15 is a circuit diagram of the same circuit as FIG. 14, wherein single resistors of appropriate values have been substituted for the pairs of parallel and series resistors shown in FIG. 14;

FIG. 16 is a circuit diagram of a compensator in which the lead and lag networks are the respective duals of those shown in FIG. 13, merged in the same manner as those of FIG. 13;

FIG. 17 is a circuit diagram of a compensator in which the lead and lag networks are the respective duals of those shown in FIG. 14, merged in the same manner as those of FIG. 14;

FIG. 18 is a circuit diagram of a composite phase slope compensator formed by connecting the input and output terminals of the circuit of FIG. 13 to the respective terminals of the circuit of FIG. 16;

FIG. 19 is a circuit diagram of a composite phase slope compensator formed by interconnecting the circuits of FIGS. 15 and 17 in the manner of FIG. 18; and FIG. 20 is the circuit of FIG. 19 with parallel connected capacitor elements replaced by a single capacitor of appropriate value, and pairs of resistors replaced by single equivalent resistors as in FIG. 15.

Referring to FIG. 1, 90° phase shifter 1 is a known type of circuit designed to produce a phase shift $\theta$ which is exactly 90° at a design center frequency $\omega_0$, and remains within limits $90° \pm \Delta\theta$ throughout a frequency range $\omega_0 \pm \Delta\omega$. One 90° phase shifter of this type is shown in FIG. 2. This circuit is also shown and described in detail in U.S. patent application Serial No. 210,055, filed July 16, 1962, by Norman J. Anderson. Briefly, the circuit of FIG. 2 includes a transformer 2 with a center tapped grounded secondary connected to apply an input signal $e$ in opposite polarities $+e$ and $-e$ to a resistor 3 and a capacitor 4, which are connected together to an output terminal 5. A capacitor 6 and a resistor 7 are connected in series with each other from the output terminal 5 to ground. The RC product of resistor 3 and capacitor 4 is equal to that of resistor 7 and capacitor 6, and is the reciprocal of the design center angular frequency $\omega_0$.

Referring to FIG. 3, the phase shift $\theta_s$ produced by the circuit of FIG. 2 is exactly 90° lagging at the design center frequency $\omega_0$, somewhat less than 90° at the lower frequency $\omega_0 - \Delta\omega$, and somewhat more than 90° at the higher frequency $\omega_0 - \Delta\omega$. The phase slope is at a minimum at $\omega_0$, and small over the range $\omega_0 \pm \Delta\omega$, and negative at all frequencies.

The phase slope at $\omega_0$ may be made to approach zero by making the ratio of the resistances of resistors 3 and 7 approach infinity; however this technique is limited by the fact that the attenuation or insertion loss of the phase shifter also approaches infinity, because the phase slope is inversely proportional to the attenuation at $\omega_0$. In a typical practical embodiment of the phase shifter of FIG. 2, the attenuation at $\omega_0$ is three, and the phase slope at $\omega_0$ is one-third the incremental frequency; i.e. if the frequency changes one percent, the phase angle changes one-third percent.

With the connections shown, the phase shifter of FIG. 2 provides an output $e_s$ that lags the input $e$. The circuit may be made to provide a leading phase shift by reversing the secondary connections of the transformer 2. The phase shift vs. frequency characteristic will remain the same as shown in FIG. 3, except that the value of $\theta_s$ will be $+90°$ at $\omega_0$, will approach $+180°$ as the frequency approaches zero, and will approach zero as the frequency approaches infinity. The phase slope will be negative, exactly as in the case of the lagging phase shift connection.

Returning to FIG. 1, the output $e_s$ of the phase shifter 1 is applied to a phase slope compensator comprising a phase lead network 8, a phase lag network 9, and an adding network 10. The input terminals of the phase lead and lag networks are coupled to the output terminal of the phase shifter 1, and the outputs of the lead and lag networks are additively combined in the adding network 10 to provide a resultant output $e_0$.

The combination of networks 8, 9 and 10 operates, in a manner to be described more fully below, to provide a phase shift vs. frequency characteristic as shown in FIG. 4. The phase shift $\theta_c$ of the compensator is zero at $\omega_0$, somewhat negative, or lagging, at the lower operating band limit $\omega_0 - \Delta\omega$, and correspondingly positive, or leading, at the upper band limit $\omega_0 + \Delta\omega$.

In the operation of the system of FIG. 1, the output of the phase shifter 1 passes through the compensator 8, 9, 10, superimposing the characteristic of FIG. 4 upon that of FIG. 3. The total phase shift between the input $e$ and the output $e_0$ is $\theta_t = \theta_s + \theta_c$. Referring to FIG. 5, it is seen that $\theta_t$ does not remain exactly at 90° throughout the band $\omega_0 \pm \Delta\omega$, because the curve of FIG. 4 is not exactly complementary to that of FIG. 3. However, the error is zero at $\omega_0$ and at two other points 11 and 12 within the band, and very small, typically about one-tenth degree, at the band limits $\omega_0 - \Delta\omega$ and $\omega_0 + \Delta\omega$.

FIG. 6 shows a simple phase slope compensator circuit useful in certain applications involving a relatively modest operating bandwidth. The phase lead network 8 comprises a series capacitor arm 13 and a shunt resistor arm 14, the lag network 9 comprises a series resistor arm 15 and a shunt capacitor arm 16. The adding network 10 consists of a pair of resistors 17 and 18 connected from the respective output terminals of the networks 8 and 9 to a common output terminal 19.

Referring to FIG. 7, the upper semicircular curve 20 is a polar diagram of the voltage transfer characteristic of the lead network 8, representing the locus of the vector ratio $$\frac{\dot{e}_1}{\dot{e}_s}$$

as the frequency is increased going clockwise from $\omega = 0$ at the left end of the curve 20 to $\omega = \infty$ at the right end of the curve 20. Considering the input $e_s$ as a unity amplitude reference, the output $e_1$ of the network 8 varies in amplitude from zero at $\omega = 0$ to unity at $\omega = \infty$. At a frequency $\omega_1$, the phase is $-45°$ and the amplitude is $\sqrt{2}$. This is the frequency at which the reactance of capacitor 13 equals the resistance of resistor 14, and is called the "break" frequency. The frequency $\omega_1$, expressed in radians per second, is numerically equal to the reciprocal of the product of the resistance in megohms and the capacitance in microfarads.

The lower semicircular curve 21 in FIG. 7 is a polar diagram of the voltage transfer characteristic of the lag network 9. The frequency increases, going clockwise from the right end of the curve 21, from $\omega = 0$ to $\omega = \infty$ at the left end of the curve 21. The output $e_2$, referred to $e_s$, varies in amplitude from unity at $\omega = 0$ to zero at $\omega = \infty$. As in the case of the lag network, there is a break frequency at which the reactance of capacitor 16 equals the resistance of resistor 15. At this frequency, $\omega_2$, the phase is $-45°$ and the amplitude is $\sqrt{2}$.

The networks 8 and 9 are designed, by appropriate selection of their respective RC products, to have break frequencies $\omega_1$ and $\omega_2$ respectively higher and lower than the center frequency $\omega_0$, so related that their geometric mean is $\omega_0$:

$$\sqrt{\omega_1 \omega_2} = \omega_0$$

As a result, the outputs $e_1$ and $e_2$ will be of equal amplitudes at $\omega_0$, and will be displaced in phase by equal amounts and opposite directions with respect to the reference $e_s$, i.e. $\theta_2 = -\theta_1$ at $\omega_0$, where $\theta_1$ is the phase shift of the signal $e_1$ and $\theta_2$ is the phase shift of the signal $e_2$.

The adding resistors 17 and 18 are equal, and of sufficiently high resistance that their loading effects upon the networks 8 and 9 are negligible. The voltage $e_0$ appearing at their junction is effectively the vector average of $e_1$ and $e_2$. As shown in FIG. 7, $e_0$ is at the midpoint of a line between the vectors $e_1$ and $e_2$, and at the frequency $\omega_0$ is in phase with the reference $e_s$.

As the frequency is increased from $\omega_0$ to a higher frequency $\omega_0 + \Delta\omega$, both vectors $e_1$ and $e_2$ will move clockwise on their respective loci 20 and 21, to points 22 and 23 respectively. Their average $e_0$ will be at the midpoint 24 of the line between 22 and 23.

In other words, the vector $e_0$ rotates counter-clockwise about the origin 0 as the frequency is increased from $\omega_0$, and $e_0$ leads $e_s$ by a certain amount. Similarly, as the frequency is decreased from $\omega_0$, $e_0$ will rotate clockwise, in the lagging direction. Thus the transfer characteristic of the circuit of FIG. 6 exhibits a positive phase slope in the vicinity of $\omega_0$, as shown in FIG. 4. The amount of phase shift introduced at the band limits $\omega_0 + \Delta\omega$ and $\omega_0 - \Delta\omega$ depends upon the ratio of the lead and lag break frequencies $\omega_1$ and $\omega_2$; these may be selected so as to undercompensate the phase shifter by a small amount at the band limits, distributing the small remaining phase error equally above and below the nominal 90°, as shown in FIG. 5.

Returning to FIG. 7, it will be observed that the vector $e_0$ increases perceptibly in amplitude as the frequency departs from $\omega_0$. This represents an undesirable frequency dependent variation in the overall attenuation or insertion loss of the system, and limits the useful bandwidth of the combination of phase shifter and compensator in some practical applications.

FIG. 8 shows a phase lead circuit similar to the phase lead circuit 13, 14 of FIG. 6 but modified by the addition to the series arm of a "stop" element consisting of a resistor 25 shunting the capacitor 13. The effect of the stop element is to prevent the impedance of the series arm from exceeding a predetermined finite value, that is the value of resistor 25, as the frequency is decreased.

The resulting transfer characteristic is illustrated by the upper semicircle 26 in FIG. 10. At zero frequency, the transmission is finite, being determined by the values of resistors 25 and 14 acting as a resistive voltage divider, and the phase angle is zero, since the infinite reactance of capacitor 13 is shunted by the finite resistance of resistor 25. At infinite frequency, the transmission is unity and the phase shift is zero, as in the simple lead network of FIG. 6.

The network of FIG. 8 has a main break frequency $\omega_1$ determined principally by the RC product of resistor 14 and capacitor 13, and a secondary break frequency $\omega_1'$ determined by the RC product of resistors 14 and 25 in parallel and capacitor 13. A straight line drawn from the origin in FIG. 10 to the point on curve 26 corresponding to $\omega_1$ will intersect the curve at the point corresponding to $\omega_1'$, as indicated. Maximum phase shift occurs at a frequency $\omega_m$ between $\omega_1$ and $\omega_1'$.

FIG. 9 shows a phase lag network similar to the phase lag network 15, 16 of FIG. 6 but modified by the addition to the shunt arm of a stop element consisting of a resistor 27, in series with the capacitor 16. The effect of the stop element is to prevent the impedance of the shunt arm from becoming less than a predetermined value, that is the value of resistor 27, as the frequency is increased.

The transfer characteristic of the circuit of FIG. 9 is illustrated by the lower semicircle 28 in FIG. 10. The phase shift is zero at zero and infinite frequencies. The transmission is unity at zero frequency, and of a finite value, determined by resistors 15 and 27, at infinite frequency. There is a main break frequency at $\omega_2'$, determined by the resistor 15 and capacitor 16, and a secondary break frequency $\omega_2$, determined by the capacitor 16 and resistors 15 and 27.

For use in the system of FIG. 1, the circuits of FIGS. 8 and 9 are designed to place their break frequencies $\omega_1$ and $\omega_2$ respectively above and below the center frequency as in the circuit of FIG. 6. The effect of stop resistors 25 and 27 is to displace the left-hand ends of curves 26 and 28 in FIG. 8 to the right of the origin.

Assuming the adding network 10 to be of the type shown in FIG. 6, the output vector $e_0$ (FIG. 10) is at the midpoint of the line between $e_1$ and $e_2$, and is in phase with the reference $e_s$ at $\omega_0$. With changes in frequency from $\omega_0$, vectors $e_1$ and $e_2$ move substantially as described with reference to FIG. 7, and the vector $e_0$ moves in the positive phase slope sense. However, owing to the displacement of the curves 26 and 28 from the origin, the variation in phase of $e_0$ with frequency is more linear than in the case of the circuit of FIG. 6 as illustrated in FIG. 7. Accordingly, the circuits of FIGS. 8 and 9 may be designed to place $\omega_1$ and $\omega_2$ further apart, to provide phase slope compensation over a wider band than the corresponding circuits of FIG. 6, while maintaining the phase error within acceptable limits.

FIG. 11 shows another type of phase lead step network, wherein the stop element is a capacitor 30 added to the shunt arm, in series with the resistor 14. This network can be designed to provide a transfer characteristic exactly like that of the circuit of FIG. 8 represented by the curve 26 of FIG. 10, and is referred to as its "dual." Similarly, the circuit of FIG. 12 is a phase step lag circuit wherein the stop element is a capacitor 31 added to the series arm, in parallel with the resistor 15. This circuit can be designed to provide a transfer characteristic identical to that of the circuit of FIG. 9 as shown by the curve 28 of FIG. 10, and is the dual of said circuit. The circuits of FIGS. 11 and 12 can be used in the system of FIG. 1 in the same manner as the circuits of FIGS. 8 and 9.

Although the circuits of FIGS. 11 and 12 have the same voltage transfer characteristics as their respective counterparts, their impedances vary with frequency in entirely different manners, because the stop elements are reactive rather than resistive. This difference can be used to advantage in more complex phase slope compensator circuits, as will be described later.

All of the phase slope compensators thus far described include an adding network 10 such as the resistors 17 and 18 of FIG. 6. The resistors effectively isolate the lead and lag networks, preventing them from loading each other, while permitting their outputs to be additively combined. However, they are in turn loaded by the impedance of the utilization device to which the phase shifted signal is to be supplied, and if said impedance is relatively low, they introduce undersirably high attenuation.

The adding resistors can be eliminated by combining the lead and lag networks in such fashion as to minimize their effects on each other, to form a composite network having a common output terminal.

Referring to FIG. 13, the lead and lag networks of FIGS. 8 and 9 have been merged by connecting their series arms in series with each other, and their shunt arms in parallel with each other. The circuit of FIG. 13 performs similarly to the combination of the circuits of FIGS. 8 and 9 with adding resistors except that it is not as susceptible to loading effects and provides more phase slope. Also, it requires two less circuit elements, i.e. resistors.

Another, and in some ways preferable, manner of merging the networks of FIGS. 8 and 9 is illustrated in FIG. 14. In this case the series arms of the two networks are connected in parallel with each other, and the shunt arms are connected in series with each other. The circuit of FIG. 14 provides approximately the same performance as that of FIG. 13 but somewhat less phase slope. In the circuit of FIG. 14, the series arm includes the resistors 15 and 25 of the lead and lag networks in parallel with each other. These may be replaced by a single equivalent resistor 32. The circuit of FIG. 15 is electrically identical with that of FIG. 14, but requires only two resistors and two capacitors.

The duals of the circuits of FIGS. 8 and 9 can also be merged in either of the above described manners. Referring to FIG. 16, the series arms of the networks of FIGS. 11 and 12 are connected in series with each other, and the shunt arms are connected in parallel with each other. As in the case of the circuit of FIG. 13, six individual circuit elements (resistors and capacitors) are required, because no pair of such elements is in such relationship that it can be replaced with a single equivalent element.

When the networks of FIGS. 11 and 12 are merged by connecting their series arms in parallel and their shunt arms in series, the number of discrete circuit elements may be reduced. Referring to FIG. 17, the capacitor 34 in the series arm is equivalent to the parallel combination of the capacitors 13 and 31 of FIGS. 11 and 12. The capacitor 35 in the shunt arm is equivalent to the series combination of capacitors 30 and 16 of FIGS. 11 and 12.

The circuits of FIGS. 15 and 17, when designed in the manner outlined above, have identical voltage transfer characteristics like that shown in FIG. 10. The circuits themselves appear to be identical or fully equivalent, from a comparison of FIGS. 15 and 17. However, they are quite different in values and in the manner their input impedances vary with frequency, since the circuit of FIG. 15 is derived from the step networks of FIGS. 8 and 9, using resistive stop elements, and the circuit of FIG. 17 is derived from the step networks of FIGS. 11 and 12, using capacitive stop elements.

The following table offers a comparison of the values of the corresponding circuit elements of two networks, A and B, both designed for a center frequency of 178 cycles per second and band limits of 100 and 316 cycles per second, and both designed to the same input and output impedance levels:

|  | A | B |
|---|---|---|
| Series arm resistor, ohms | 10,000 | 50,000 |
| Series arm capacitor, mfd | 0.02 | 0.1 |
| Shunt arm resistor, ohms | 10,000 | 2,000 |
| Shunt arm capacitor, mfd | 0.5 | 0.1 |

Network A corresponds to FIG. 15, and network B corresponds to FIG. 17. It is apparent that the input impedance of network A is primarily resistive in the vicinity of $\omega_0$, while that of network B is primarily capacitive.

The output impedance of the phase shifter of FIG. 2 comprises resistive and capacitive reactive components that are equal in magnitude at the center frequency $\omega_0$. It is desirable that the phase compensator present a similar input impedance. The characteristic can be obtained by connecting the circuits of FIGS. 15 and 17 in parallel with each other, as indicated in FIG. 19.

Since the voltage transfer characteristics of the two component circuits are identical, the circuits do not load each other, and will operate together to provide the same transfer characteristics as each has by itself. The input impedance of the composite network is a combination of resistance and capacitive reactance equal at $\omega_0$, like the output impedance of the phase shifter of FIG. 2. By combining the parallel connected series arm resistors 15 and 32 as a single resistor 36, FIG. 20, and the series arm capacitors 13 and 34 as a single capacitor 37, the number of circuit elements is reduced to a total of six.

The design of a phase slope compensator of the type shown in FIG. 20 to be used with a 90 degree phase shifter like that of FIG. 2 will now be described. It can be shown that the phase error, i.e. departure from exactly 90 degrees phase shift, of the phase shifter of FIG. 2, at any frequency $\omega$ is:

$$\Delta\theta = -\tan^{-1}\frac{p-\frac{1}{p}}{2\alpha_r}$$

where $p=\omega/\omega_0$, and $\alpha_r$ is the ratio of the attenuation at $\omega_0$ to the attenuation at zero and infinite frequencies.

To compensate the error $\Delta\theta$ exactly, the compensator should provide a phase shift $$\tan^{-1}\frac{p-\frac{1}{p}}{2\alpha_r}$$

The actual phase shift produced by the circuit of FIG. 20 is:

$$\theta_C = \tan^{-1}\left(p-\frac{1}{p}\right)\frac{(\alpha_R-1)\left(q+\frac{1}{q}\right)}{\left(p-\frac{1}{p}\right)^2+\alpha_R\left(q+\frac{1}{q}\right)^2}$$

where $\alpha_R$ and $q$ are constants determined by the values of the circuit elements. Since the denominator of the above expression contains the term $$\left(p-\frac{1}{p}\right)^2$$

$\theta_C$ will depart from the precise desired value $-\Delta\theta$ in a frequency dependent manner. The amount of this departure can be negligibly small throughout a wide frequency band by making $\alpha_R$ and $q$ sufficiently large or small.

Denoting the circuit elements 36, 37, 33, 16, 35 and 14 respectively as $R_0$, $C_0$, $R_1$, $C_1$, $C_2$ and $R_2$, as indicated in FIG. 20, the following relationships exist:

$$\omega_0 = \frac{1}{R_0 C_0}$$

$$\omega_1 = \frac{1}{R_1 C_1}$$

$$\omega_2 = \frac{1}{R_2 C_2}$$

$$q = \frac{\sqrt{\omega_2}}{\sqrt{\omega_1}} = \frac{\omega_0}{\omega_1} = \frac{\omega_2}{\omega_0} = \frac{R_1}{R_2} = \frac{C_1}{C_2}$$

$$\alpha_R = \frac{R_0}{R_1}\frac{1+q}{q+\frac{1}{q}}+1$$

In a typical design of the circuit for operation over a frequency band of 3.16 to 1 ($p = .56$ to $1.78$), with a maximum phase error of about 0.1 degrees, $\alpha_R$ may be about 2. This choice requires that $q$ be about 5. The figures for $\alpha_R$ and $q$ fix the following:

$$\frac{R_1}{R_2} = \frac{C_1}{C_2} = 5$$

$$\frac{R_0}{R_1} = 0.86$$

Suppose the desired center frequency is 160 cycles per second. Then $\omega_0 = 905$, and $$R_0 C_0 = \frac{1}{905}$$

The total shunt branch impedance of the network at $\omega_0$ is $$Z_p = R_1\frac{\left(q+\frac{1}{q}\right)}{\sqrt{2}(1+q)}$$

Thus, the value of $R_1$ in the present example is $$R_1 = 1.63\ Z_p$$

Assuming the desired impedance to be about 6100 ohms, $R_1$ is 10,000 ohms. The values of the other circuit elements then work out as follows:

$R_0 = 8330$ ohms
$C_0 = 0.12$ mfd.
$C_1 = 0.5$ mfd.
$C_2 = 0.1$ mfd.
$R_2 = 2000$ ohms Although the phase slope compensator of FIG. 20 is presently preferred owing to its structural simplicity, similar performance can be obtained by a parallel combination of the circuits of FIGS. 13 and 16. In the resulting combination, shown in FIG. 18, the elements 13, 14, 15 and 16 are duplicated. Further, none of the elements are paired in such manner that they can be directly replaced by single elements. Thus, the circuit of FIG. 18 requires twelve circuit elements, twice the number in that of FIG. 20.

The circuit of FIG. 18 has four shunt arms, one purely resistive, one purely capacitive, and two each containing a resistor and capacitor in series. Some advantage may be obtained from this complexity if the load presented by the utilization device includes reactive and resistive impedance components. For example, shunt capacitance can be accommodated by making the capacitor 16 smaller than its design value, by an amount equal to the shunt capacitance of the load device. Shunt resistance can be absorbed similarly in the resistor 14. Series combinations can be handled by trimming the values of one or more of the elements in the other shunt arms.

The circuit of FIG. 20 can also be designed to accommodate the load resistance and reactance, in the manner described in the above mentioned copending application Serial Number 210,055. The existing load is "trimmed" by adding capacitance or resistance as required to provide a time constant equal to $R_0 C_0$. Then the values of resistor 36 and capacitor 37 are changed so that their parallel combination with the "trimmed" load is equivalent to the design value of $R_0$, $C_0$. In this manner the load is absorbed in the network; the modified network operates with the load as the unmodified network would operate without a load.

While the invention has been described principally with regard to its use with a phase shifter of the type shown in FIG. 2, it is clearly adaptable to other devices requiring precise phase slope compensation.

I claim:

1. A phase slope compensator for effecting a small positive phase slope correction throughout an operating frequency band including a phase lead network and a phase lag network having a common input terminal to be supplied from an A.C. source to be compensated, said networks being designed to produce equal attenuations and equal and respectively opposite phase shifts at the center frequency of said operating band, said phase lead network having a break frequency higher than said center frequency and said phase lag network having a break frequency lower than said center frequency, the outputs of said network being additively combined.

2. The invention set forth in claim 1, wherein said networks are step networks, each having a series arm and a shunt arm.

3. The invention set forth in claim 2, wherein the shunt arm of the lead network and the series arm of the lag network are resistors.

4. The invention set forth in claim 2, wherein the series arm of the lead network and the shunt arm of the lag network are capacitors.

5. The invention set forth in claim 2, wherein the series arms of said networks are connected together to form a common series arm and the shunt arms of said networks are connected together to form a common shunt arm, said common shunt arm constituting means for additively combining the outputs of said networks.

6. The invention set forth in claim 5, wherein the step networks have resistive stop elements shunt connected to the lead network portion of the common series arm and series connected to the lag network portion of the common shunt arm, respectively.

7. The combination of two circuits of the type claimed in claim 5, with their input terminals connected together and their output terminals connected together, one of said circuits having resistor stop elements and the other of said circuits having capacitor stop elements.

8. The combination of two circuits of the type claimed in claim 5, one of said circuits having resistor stop elements and the other of said circuits having capacitor stop elements, the common series arm of one of said circuits being connected in parallel with that of the other circuit to form a composite series arm, and the common shunt arm of one of said circuits being connected in series with that of the other circuit to form a composite common shunt arm.

9. The invention set forth in claim 5, wherein the series arms of said networks are connected in series with each other and the shunt arms of said networks are connected in parallel with each other.

10. The combination of two circuits of the type claimed in claim 9, with their input terminals connected together and their output terminals connected together, one of said circuits having resistor stop elements and the other of said circuits having capacitor stop elements.

11. The invention set forth in claim 5, wherein the series arms of said networks are connected in parallel with each other and the shunt arms of said networks are connected in series with each other.

12. The combination of two circuits of the type claimed in claim 11, with their input terminals connected together and their output terminals connected together, one of said circuits having resistor stop elements and the other of said circuits having capacitor stop elements.

References Cited by the Examiner
UNITED STATES PATENTS
3,054,064   9/1962   Sherman _____ 324—82 X JOHN F. COUCH, *Primary Examiner.*

LLOYD McCOLLUM, *Examiner.*

D. L. RAE, A. D. PELLINEN, *Assistant Examiners.*